United States Patent [19]

Gorun

[11] Patent Number: 5,324,495
[45] Date of Patent: Jun. 28, 1994

[54] METHOD OF MAKING METAL FULLERIDE

[75] Inventor: Sergiu M. Gorun, Upper Montclair, N.J.

[73] Assignee: Exxon Research and Engineering Company, Florham Park, N.J.

[21] Appl. No.: 134,502

[22] Filed: Oct. 8, 1993

Related U.S. Application Data

[63] Continuation of Ser. No. 820,716, Jan. 14, 1992, abandoned, which is a continuation-in-part of Ser. No. 798,390, Nov. 26, 1991, abandoned.

[51] Int. Cl.$^5$ ............... H01L 39/24; H01L 39/12; C01B 31/00
[52] U.S. Cl. ................... 423/439; 252/62.51; 252/500; 252/518; 423/414; 423/DIG. 39; 505/725; 505/775; 505/810; 505/815
[58] Field of Search .......... 423/445 B, 414, DIG. 39; 264/86; 204/59 M; 505/1, 725, 775, 810, 815; 252/500, 518, 62.51

[56] References Cited

U.S. PATENT DOCUMENTS 5,223,479  6/1993  McCavey, Jr. et al. ............. 505/1

FOREIGN PATENT DOCUMENTS 1587000  8/1990  U.S.S.R. .

OTHER PUBLICATIONS

Wang et al., *Inorganic Chemistry*, vol. 30, No. 14, pp. 2838–2839, Jul. 10, 1991.
Bausch et al., *Journal of American Chemical Society*, vol. 113, No. 8, pp. 3205–3206, Apr. 10, 1991.
Heath et al., *Journal of American Chemical Society*, vol. 107, No. 25, pp. 7779–7780, Dec. 11, 1985.
Chai et al., *Journal of Physical Chemistry*, vol. 95, No. 20 pp. 7564–7568, Oct. 3, 1991.
Bausch, et al., "Diamagnetic Polyanions of the $C_{60}$ and Fullerenes: Preparation, C and $^7$Li NMR Spectroscopic Observation and Alkylation with Methyl Iodide to Polymethylated Fullerenes", J. Am. Soc., 113, 3205–3206 (1991).
Wang, et al., "First Easily Reproduced Solution-Phase Synthesis and Confirmation of Superconductivity in the Fullerene $K_xC_{60}$ ($T_c$=18.0+0.1K)", Inorg. Chem., 30, 2838–2839 (1991).
Wang, et al., "Superconductivity at 28.6 K in a Rubidium-$C_{60}$ Fullerene Compound, $Rb_xC_{60}$, Synthesized by a Solution-Phase Technique", Inorg. Chem., 30, 2962–2963 (1991).
Cox, et al., "Carbon Clusters Revisited: The Special Behavior of $C_{60}$ and Large Carbon Clusters", J. Chem. Phys., 88(3), 1588, Feb. 1, 1988.

(List continued on next page.)

*Primary Examiner*—Michael Lewis
*Assistant Examiner*—Stephen G. Kalinchak
*Attorney, Agent, or Firm*—Linda M. Scuorzo

[57] ABSTRACT

The present invention relates to a new process for making metal fulleride compositions having the formula $A_n(C_x)_m$, wherein A is a metal cation and $C_x$ is a fullerene anion, preferably $C_x$ is $C_{60}$ or $C_{70}$, wherein n is a number equal to the absolute value of the valence of the fullerene anion, wherein m is equal to the absolute value of the valence of A, wherein the values of n and m are divided by their greatest common factor, if any, and wherein the metal fulleride composition is neutral in charge. This process comprises reacting a metal with a fullerene in a solvent or mixture of solvents in which the fullerene is at least partly soluble at a temperature from greater than the freezing point to equal to or less than the boiling point of the solvent, for a time sufficient to form the metal fulleride composition. The process has utility in making metal fulleride compositions which may be used as electrode material in reversible electrochemical cells, superconductors, spin labels, magnetic thermometers, organic and polymer precursors.

6 Claims, No Drawings

OTHER PUBLICATIONS

Holczer, et al., "Alkali-Fulleride Superconductors: Synthesis, Composition and Diamagnetic Shielding", Science, 252(3), 1154–1157, 1991 and Science 252, 1–3 Report (1991).

Fagan, et al., "The Chemical Nature of Buckminsterfullerenes $C_{60}$ and the Characterization of a Platinum Derivative", Science, 252, 1160–1161 (1991).

McCauley, et al., "Synthesis Structure and Superconducting Properties of Single-Phase $Rb_3C_{60}$", 113 J. Am. Chem. Soc., 8537–8538 (1991).

Fleming, et al., "Preparation and Structure of Alkali-Metal Fulleride $A_4C_{60}$", Nature, 352, 701–703 (1991).

Hebard, et al., "Superconductivity at 18K in Potassium Doped $C_{60}$", Nature, 350, 600–601 (1991).

Zhou, et al., "Structure and Bonding in Alkali-Metal-Doped $C_{60}$", Nature, 351, 462–464 (1991).

Haddon, et al., "Conducting Films of $C_{60}$ and $C_{70}$ by Alkali Metal Doping", Nature, 350, 320–322 (1991).

Fagan, et al., "A Multiply-Substituted Buckminsterfullerene ($C_{60}$) with Octahedral Array of Platinum Atoms", J. Am. Chem. Soc., 113, 9408–9409 (1991).

Dubois, et al., "Electrochemical Detection of Fulleronium and Highly Reduced Fulleride ($C_{60}^{-5}$) Ions in Solution", J. Am. Chem. Soc., 113, 7773–7774 (1991).

Duclos, et al., "Raman Studies of Alkali-Metal Doped $A_xC_{60}$ Films", Science, 254, 1625 (1991).

D. M. Cox, et al., "Carbon Clusters Revisited: The special behavior of $C_{60}$ and large carbon clusters," J. Phys. Chem 88(3) Feb. 1, 1988 pp. 1588–1597.

METHOD OF MAKING METAL FULLERIDE

This application is a continuation of application Ser. No. 820,716, filed Jan. 14, 1992 now abandoned, which is continuation in part of application Ser. No. 798,390, filed Nov. 26, 1991, now abandoned.

FIELD OF THE INVENTION

The present invention relates to a method of making metal fulleride compositions.

BACKGROUND OF THE INVENTION

Diamond and graphite are two well known allotropic forms of carbon. A new allotropic form, the fullerenes, has been prepared by graphite volatilization (see W. Krätschmer et al., *Nature*, 347, 354 (1990)).

Typically, fullerenes each have 12 pentagons, but differing numbers of hexagons. The pentagons are required in order to allow the curvature and eventual closure of the surface upon itself. The most abundant species of fullerenes identified to date is the $C_{60}$ molecule or Buckminsterfullerene. $C_{60}$ is a hollow molecule that consists of carbon atoms located at the vertices of 12 pentagons and 20 hexagons arranged to form an icosahedron. The inner hollow space of the fullerene (about 3.8 Angstroms in diameter) can accommodate any metal ion of the periodic table, thus suggesting that at least two isomers of any given fullerene-metal composition can exist: the metal may be inside (endohedral) or outside (exohedral) the fullerene cage. The second most abundant species classified to date is $C_{70}$ and contains 12 pentagons and 25 hexagons. Fullerenes containing from 30 to many hundreds carbon atoms have detected by mass spectrometry. For further information concerning fullerenes, see, e.g., H. W. Kroto et al., *Chemical Reviews*, 91, 1213-1235 (1991).

As used in this application, the term "fullerenes" means hollow, all carbon-containing molecules having carbon atoms only in even numbers and located at the vertices of 12 pentagons (five membered carbon rings), but having differing numbers of hexagons (six membered carbon rings), and having the formula $C_{2n}$ where n is 10 or greater.

Ions of metal complexes of fullerenes have been observed in the gas phase by mass spectrometry (see J. R. Heath, et al. *J. Am. Chem. Soc.*, 107, 7779 (1985), and D. M. Cox et al., *J. Chem. Phys.*, 88( 3), 588 ( 988)).

Bausch et al., *J. Am. Chem. Soc.*, 113, 3205-3206 (1991) discloses the synthesis of $Li_xC_{60}$ and $Li_xC_{70}$ salts in tetrahydrofuran ("THF"), but requires the use of ultrasound to effect the synthesis. Applicant's process is different from the foregoing in that it does not use ultrasound. Finally, Wang, et al., *Inorg. Chem.*, 30, 2838-2839 (1991) discloses a process for making $K_xC_{60}$ by reacting potassium with a solution of $C_{60}$ in toluene. The process of applicant's invention was made before the foregoing two publication dates.

The portion of the disclosure herein that relates to $C_{60}$ fulleride salts having the formula $A_n(C_x)_m$ wherein A is a monovalent metal cation, n is from +1 to +3 depending on the valence of $C_x$ and $C_x$ is a $C_{60}$ fulleride anion (where m equals 1) having a valence of from $-1$ to $-3$ is the subject of copending application U.S. Ser. No. 798,390 filed Nov. 26, 1991.

SUMMARY OF THE INVENTION

This invention relates to a process for making metal fulleride compositions by reacting a fullerene, $C_x$, and a metal in an inert solvent. The term "metal fulleride composition" as used herein includes both endohedral and exohedral compositions. The metal fulleride compositions made by the process of the present invention are neutral molecules that have the formula $A_n(C_x)_m$, wherein $C_x$ is a fullerene anion, preferably an anion of $C_{60}$ or $C_{70}$, wherein m is the number of fullerene anions in the metal fulleride composition and is equal to the absolute value of the valence of the metal, wherein A is a metal cation, more specifically a metal cation bonded to the fullerene anion by an ionic bond and having a valence formally in the range of from +1 to +7, specifically, +1, +2, +3, +4, +5, +6 or a metal bonded to the fullerene by a partially ionic/partially covalent bond, or a metal bonded to the fullerene by a covalent bond, wherein n is a number that renders the composition neutral in charge and wherein n and m are divided by their greatest common factor, if any. As used herein, the term "exohedral metal fulleride composition" means a metal fulleride composition in which the metal is associated with the external surface of the fulleride rather than contained within the fullerene cage. The bond that associates the metal with the carbon surface of the fulleride may suitably be covalent, ionic or partially covalent/partially ionic character.

The process is suited to making metal fulleride compositions, which have the following utility: (1) the metal fulleride compositions that exhibit reversible electrochemical reduction are particularly useful as electrode components in electrochemical cells such as secondary batteries; (2) the metal fulleride compositions that contain unpaired electrons and thus have paramagnetic properties may be used as magnetic thermometers since a one-to-one magnetic susceptibility temperature correspondence exists, (for example, it is known that the magnitude of the magnetic susceptibility of a paramagnetic compound varies, in general, with temperature; the Curie-Weiss law, which is known to one having ordinary skill in the art is one example of such a dependency); (3) metal fulleride compositions that contain certain fullerene monoanions, $C_{60}^{-1}$, may be used as semiconductors (see P. M. Allemand, et al., *J. Am. Chem. Soc.*, 113, 2780 (1991), while those containing certain fullerene trianions, $C_{60}^{-3}$, and alkali metal cations having a valence of +1 may be used as superconductors (see A. F. Hebard et al., *Nature*, 350, 600 (1991)); (4) alkali salts of fullerenes also can serve as starting materials for the preparation of other materials, for example, the reaction of the lithium salt of $C_{60}$ with alkyl halides yield alkyl derivatives of fullerenes (see J. W. Bausch et al., *J. Am. Chem. Soc.*, 113, 3205 (1991)) that may be used as polymer blends, composites and polymer building blocks; and (5) the metal fulleride compositions that have a stable free radical character may be used as spin labels. Spin labels are usually organic molecules that contain an unpaired electron (for example, a nitroxyl radical) and are used to render diamagnetic molecules to which they are attached or with which they are mixed susceptible to analysis by magnetic resonance techniques. Such spin labels, when mixed, for example, with polymers, may allow valuable information concerning polymer dynamics and structures to be obtained.

DETAILED DESCRIPTION OF THE INVENTION

The metal-free fullerenes and other materials needed for the practice of the present invention can be obtained from commercial sources. In addition, the metal-free fullerenes may be prepared by graphite volatilization (see W. Krätschmer et al., *Nature*, 347, 354 (1990)).

The embodiments of the present invention may suitably comprise, consist or consist essentially of the elements disclosed herein.

The present invention encompasses a process for making metal fulleride compositions by reaction of a metal with a fullerene in a suitable solvent.

The process of the present invention comprises contacting a fullerene with a metal in a solvent (or solvent/cosolvent system) in which the fullerenes are at least partly soluble. Typically, the fullerene is dissolved or slurried in an appropriate solvent, and the metal is added thereto. Appropriate solvents include toluene, benzene, nitriles, liquid $SO_2$, sulfolanes and the like. One skilled in the art would be capable of selecting a solvent that is appropriate for the particular fullerene and inert to the fullerene and metal. The solvent should be degassed and free of reactive impurities such as water and oxygen. The reaction should be carried out in an inert atmosphere (such as nitrogen or argon) and may be carried out at ambient conditions, suitably at any temperature above the freezing point equal to or less than the boiling point of the solvent (or solvent/cosolvent system). For example where toluene is the solvent for $C_{60}$ the temperature may be from about 20° C. to about 60° C., although higher temperatures may be used if increased reaction rates are desired. The reaction pressure may be any pressure that can suitably be accommodated by the system in which the reaction is carried out. Although it is not required, stirring may be used to facilitate contact of the starting materials. If stirring is used, a glass covered stirrer, rather than a teflon stirrer is recommended when using certain metals, particularly alkali metals.

In the process of the present invention the metal fulleride compositions need not be soluble in the solvent (or solvent and cosolvent mixtures) used as starting materials and it is preferred that they are not, particularly if isolation of the resulting metal fulleride composition is desired. Particularly where the metal fulleride composition is more polar than the starting fullerene, decreasing the polarity of the solvent using an appropriate cosolvent can facilitate extraction, for example, by precipitation. Depending on the isolation procedure and the solvent used, the metal fulleride composition may remain associated with some amount of solvent. It is within the skill of one ordinarily skilled in the art to select procedures for removing such solvent, if removal is required.

The process of the present invention makes metal fulleride compositions, which are neutral molecules (i.e. having a net charge equal to zero) and having the formula $A_n(C_x)_m$, wherein $C_x$ is a fullerene anion, preferably a $C_{60}$ or $C_{70}$ anion, wherein m is the number of fullerene anions in the metal fulleride composition and is equal to the absolute value of the valence of the metal cation, A, wherein A is a metal cation, wherein n is a number that renders the composition neutral and wherein the values of n and m are divided by their greatest common factor, if any, and wherein the metal fulleride composition is a neutral molecule. The valence of the fullerene anion will, therefore, be from $-1$ to a maximum value, which equals the maximum number of electrons that could occupy the empty molecular orbitals of the fullerene. For example, where $C_x$ is $C_{60}$, the maximum number of electrons in the lowest empty orbital is 6; thus, in a neutral molecule, the $C_{60}$ anion will have a valence of a whole number ranging from $-1$ to $-6$ when only the lowest empty orbital is considered. The metal cation, A, may have a valence formally ranging from $+1$ to $+7$, specifically, $+1$, $+2$, $+3$, $+4$, $+5$, $+6$ or $+1$, depending on the particular metal used in the process.

Thus, it can be stated by way of example, that where $C_x$ is a $C_{60}$ anion and where A has a valence of $+1$, the metal fulleride compositions will have the formula $A^{+1}C_{60}^{-1}$, $A_2^{+1}C_{60}^{-2}$, $A_3^{+1}C_{60}^{-3}$, $A_4^{+1}C_{60}^{-4}$, $A_5^{+1}C_{60}^{-5}$, $A_6^{+1}C_{60}^{-6}$ for $C_{60}$ anions having a valence of $-1$ to $-6$, respectively. Similarly, where A has a valence of $+2$, the metal fulleride compositions will have the formula $A^{+2}(C_{60}^{-1})_2$, $A^{+2}(C_{60}^{-2})$, $A_3^{+2}(C_{60}^{-3})_2$, $A_2^{+2}(C_{60}^{-4})$, and $A_5^{+2}(C_{60}^{-5})_2$ for $C_{60}$ anions having a valence of from $-1$ to $-5$, respectively, and continuing accordingly up to the $C_{60}$ valence equal to the maximum number of electrons in the empty molecular orbitals. Metal fulleride compositions wherein $C_x$ is larger than $C_{60}$ will have formulas according to the foregoing starting at a valence of $-1$ and continuing up to the valence corresponding to the maximum number of electrons that could occupy the empty orbitals of $C_x$. Thus, by way of extension, where A has a valence of $+3$, the metal fulleride compositions will have the formula $A^{+3}(C_x^{-1})_3$, $A_2^{+3}(C_x^{-2})_3$, $A^{+3}(C_x^{-3})$, $A_4^{3}(C_x^{-4})_3$, $A_5^{+3}(C_x^{-5})_3$ for $C_x$ anions having a valence of from $-1$ to $-5$, and continuing as described above. Likewise, where A has a valence of $+4$, the metal fulleride compositions will have the formula $A^{+4}(C_x^{-1})_4$, $A^{+4}(C_x^{-2})_2$, $A_3^{+4}(C_x^{-3})_4$, $A^{+4}(C_x^{-4})$, and $A_5^{+4}(C_x^{-5})_4$ and so forth, as illustratively shown above. Thus, the valence of A and $C_x$ will affect the value of m and n, respectively, and the metal fulleride will vary in composition accordingly in a manner that should be evident to one ordinarily skilled in the art given the teachings herein. Both whole number values of n, m and of the valences of A and $C_x$, implying an ionic character of the metal fulleride bonds, as well as non-integer charges, implying a covalent or partially ionic-partially covalent character of the bonds in the compositions produced by the process of the present invention are included herein.

The metal and fullerene used as starting materials in the process of the present invention, however, should be chosen based on the redox potentials of each material. Redox potentials are known or readily measurable by one having ordinary skill in the art, for example, by electrochemical methods, in a solvent which should be chosen also according to the solubility of the fullerene therein. The choice should be made such that the reaction is thermodynamically possible at the particular reaction temperature in the particular solvent.

The preferred fullerenes used in the practice of the present invention are $C_{60}$ and $C_{70}$. However, mixtures of fullerenes, as well as samples of only one type of fullerene, may also be used in the process of the present invention. In the process of the present invention, even where the starting materials are one particular fullerene and metal, the result can be a mixture containing a number of fulleride compositions of the given metal due to the fact that a given fullerene may have a number of oxidation states.

The following examples are intended to demonstrate the invention and not limit it in any way.

EXAMPLE 1

Mixtures of $C_{60}/C_{70}$ were obtained by solvent extracting the soot produced via the carbon arc synthesis method, as stated in D. M. Cox et al., *J. Am. Chem. Soc.* 113, 2940 (1991). Pure $C_{60}$ was produced by chromatography from mixtures of $C_{60}$ and $C_{70}$ fullerenes, as described in the literature. See, for example, D. M. Cox et al., *J. Am. Chem. Soc.* 113, 2940 (1991).

110 mg of $C_{60}$ were dissolved in 110 ml of dry, degassed toluene under argon atmosphere to produce a magenta colored solution. A tenfold excess on a molar basis of freshly cut Na metal was added with stirring. Stirring was continued for several days, during which time the temperature was raised to 50° C. A black precipitate formed and, at the end of the period, the solution turned colorless, indicating that all $C_{60}$ had reacted. The black precipitate was isolated by filtration under an argon atmosphere. A slurry was made of the black precipitate and repeated decanting of the slurry left behind unreacted sodium chips. Analysis by ESR confirmed that no detectable unreacted Na was trapped in the precipitate. ESR also indicated the presence of sodium $C_{60}$ fulleride compositions in the black precipitate.

EXAMPLE 2

The same procedure as is specified in Example 1 may be used, substituting $C_{70}$ for $C_{60}$ to produce sodium $C_{70}$ fulleride.

What is claimed is:

1. A method for making a metal fulleride composition, comprising:

contacting a metal and a fullerene in a solvent in which the fullerene is soluble at a temperature in a range of from greater than the freezing point to equal to or less than the boiling point of the solvent and pressure and for a time sufficient to produce a metal fulleride composition having the formula $A_n(C_x)_m$, wherein A is a metal cation, wherein $C_x$ is a fullerene anion, wherein n is a number that renders the composition neutral in charge, wherein m is a number equal to the absolute value of the valence of the metal cation, A, and wherein the values of n and m are divided by their greatest common factor, if any.

2. The process of claim 1 wherein the fullerene is selected from the group consisting of $C_{60}$ and $C_{70}$.

3. The process of claim 1 wherein the solvent selected from the group consisting of toluene, benzene, nitriles, liquid $SO_2$ and sulfolanes.

4. The process of claim 1 wherein the solvent is toluene and the temperature is from about 20° C. to about 60° C.

5. The process of claim 1 wherein the metal cation has a valence of $+1$, $+2$, $+3$, $+4$, $+5$ and $+6$.

6. The process of claim 1 wherein the metal fulleride composition is insoluble in the solvent.

* * * * *